United States Patent
Ong et al.

(10) Patent No.: US 9,150,669 B2
(45) Date of Patent: Oct. 6, 2015

(54) PROCESS FOR THE PREPARATION OF LOW MOLECULAR WEIGHT HYDROGENATED NITRILE RUBBER

(75) Inventors: Christopher Ong, Orange, TX (US); Julia Maria Mueller, Gilgenberg (AT)

(73) Assignee: LANXESS DEUTSCHLAND GMBH, Cologne (DE)

( * ) Notice: Subject to any disclaimer, the term of this patent is extended or adjusted under 35 U.S.C. 154(b) by 311 days.

(21) Appl. No.: 13/391,634

(22) PCT Filed: Aug. 26, 2010

(86) PCT No.: PCT/EP2010/062500
§ 371 (c)(1), (2), (4) Date: Sep. 11, 2012

(87) PCT Pub. No.: WO2011/029732
PCT Pub. Date: Mar. 17, 2011

(65) Prior Publication Data
US 2013/0005916 A1   Jan. 3, 2013

(30) Foreign Application Priority Data
Aug. 31, 2009 (EP) .................................. 09169064

(51) Int. Cl.
C08C 19/02 (2006.01)
B01J 31/22 (2006.01)
C08C 19/08 (2006.01)
C08L 15/00 (2006.01)
C08C 19/00 (2006.01)

(52) U.S. Cl.
CPC ............ *C08C 19/02* (2013.01); *B01J 31/2278* (2013.01); *C08C 19/08* (2013.01); *C08L 15/005* (2013.01); *B01J 2231/543* (2013.01); *B01J 2231/643* (2013.01); *B01J 2531/821* (2013.01); *B01J 2531/825* (2013.01); *C08C 2019/09* (2013.01)

(58) Field of Classification Search
None
See application file for complete search history.

(56) References Cited

U.S. PATENT DOCUMENTS

| | | | |
|---|---|---|---|
| 5,208,296 A | 5/1993 | Rempel et al. | |
| 5,210,151 A | 5/1993 | Rempel et al. | |
| 7,951,875 B2 | 5/2011 | Guerin et al. | |
| 2002/0107138 A1 | 8/2002 | Hoveyda et al. | |
| 2004/0127350 A1 | 7/2004 | Grela | |
| 2005/0049417 A1 | 3/2005 | Arlt | |
| 2008/0064822 A1* | 3/2008 | Obrecht et al. | 525/338 |
| 2008/0076881 A1 | 3/2008 | Obrecht et al. | |
| 2008/0214741 A1* | 9/2008 | Guerin | 525/329.1 |
| 2009/0069516 A1 | 3/2009 | Obrecht et al. | |
| 2009/0076227 A1 | 3/2009 | Obrecht et al. | |
| 2009/0105423 A1 | 4/2009 | Pawlow et al. | |
| 2010/0113795 A1* | 5/2010 | Arlt et al. | 548/103 |

FOREIGN PATENT DOCUMENTS

WO    WO 2008/034552    *   3/2008

OTHER PUBLICATIONS

Schrock, Richard, R., "High-Oxidation-State Complexes, Inorganic Synthesis" Agnew Chem. Int. Ed. 2003, 42, p. 4592-4633.
Grela, K., Eur. J. Org. Chem. 2003, "A Good Bargain: An Inexpensive, air-Stable Ruthenium Metathesis Catalyst Derived from a-Asarone", pp. 963-966.
Bujok, R. "An Improved Synthesis of Highly Efficient Metathesis Initiators", J. Org. Chem. 2004, 69, pp. 6894-6896.
Krause, J. "Synthesis and Reactivity of Homogeneous and Heterogeneous Ruthenium-Based Metathesis Catalysts Containing Electron-Withdrawing Ligands", Chem. Eur. J. 2004, 10, pp. 777-784.
Grela, K. "A Highly Efficient Ruthenium Catalyst for Metathesis Reactions", Agnew. Chem. Int. Ed. 2002, 41, No. 21, p. 4038.
European Search Report, PCT/EP2010/062500, Sep. 30, 2010, 3 Pages.
Fogg, D.E., "Tandem Catalysis: A Taxonomy and Illustrative Review", Science Direct, Coordination Chemistry Reviews 248 (2004) pp. 2365-2379.

* cited by examiner

*Primary Examiner* — Robert C Boyle

(57) ABSTRACT

Pursuant to the invention a process for the production of hydrogenated nitrile rubber polymers having lower molecular weights and narrower molecular weight distributions than those known in the art in the is provided wherein the process is carried out in the presence of hydrogen and optionally at least one co-(olefin). The present invention further relates to the use of specific metal compounds in a process for the production of a hydrogenated nitrile rubber by simultaneous hydrogenation and metathesis of a nitrile rubber.

14 Claims, No Drawings

PROCESS FOR THE PREPARATION OF LOW MOLECULAR WEIGHT HYDROGENATED NITRILE RUBBER

The present invention relates to a process for the production of hydrogenated nitrile rubber polymers having lower molecular weights and narrower molecular weight distributions than those known in the art in the wherein the process is carried out in the presence of hydrogen and optionally at least one co-(olefin). The present invention further relates to the use of specific metal compounds in a process for the production of a hydrogenated nitrile rubber by simultaneous hydrogenation and metathesis of a nitrile rubber.

Hydrogenated nitrile rubber (HNBR), prepared by the selective hydrogenation of acrylonitrile-butadiene rubber (nitrile rubber; NBR, a co-polymer comprising at least one conjugated diene, at least one unsaturated nitrile and optionally further co-monomers), is a specialty rubber which has very good heat resistance, excellent ozone and chemical resistance, and excellent oil resistance. Coupled with the high level of mechanical properties of the rubber (in particular the high resistance to abrasion) it is not surprising that HNBR has found widespread use in the automotive (seals, hoses, bearing pads) oil (stators, well head seals, valve plates), electrical (cable sheathing), mechanical engineering (wheels, rollers) and shipbuilding (pipe seals, couplings) industries, amongst others.

Commercially available HNBR has a Mooney viscosity in the range of from 34 to 130, a molecular weight in the range of from 150,000 to 500,000 g/mol, a polydispersity in the range of from 2.0 to 4.0 and a residual double bond (RDB) content in the range of from <1 to 18% (by IR spectroscopy).

As outlined in independent reviews by Rempel (Journal of Macromolecular Science—Part C—Polymer Reviews, 1995, Vol. C35, pg 239-285) and Sivaram (Rubber Chemistry and Technology, July/August 1997, Vol. 70, Issue 3 pg 309), the bulk of the catalytic work concerning dienes and in particular nitrile butadiene rubber has been focused on the transition metals rhodium (Rh) and palladium (Pd). However considerable efforts have also gone into the exploration of alternative catalytic systems including iridium and Ziegler-Type catalysts. Alternatively efforts into developing ruthenium (Ru) based catalyst have attracted attention. These ruthenium based catalyst were of the general form $RuCl_2(PPh_3)_3$, $RuH(O_2CR)(PPh_3)_3$ and $RuHCl(CO)(PPh_3)_3$. One negative to the utilization of a ruthenium based catalyst was the unusually high Mooney viscosity for the resulting hydrogenated nitrile rubber due to the reduction of the nitrile groups to secondary amines, resulting in the subsequent crosslinking/gelling of the polymer. Rempel does point out that the addition of additives (i.e. $CoSO_4$ and $(NH_4)_2Fe(SO_4)_4$) to react with these amines can minimize the crosslinking/gelling.

Rempel and co-workers reported in a series of patents (U.S. Pat. Nos. 5,210,151; 5,208,296 and 5,258,647) the utilization of ruthenium based catalyst for the hydrogenation of nitrile rubber when the nitrile rubber was supplied in an aqueous, latex form and when the reactions were conducted in the presence of additives which were capable for minimalizing the reduction of the nitrile group. Specific ruthenium catalyst utilized include carbonylchlorohydrido bis(tricyclohexylphosphine) ruthenium II, dichloro tris(triphenylphosphine) ruthenium II, carbonylchlorostyrly bis(tricyclohexylphosphine) ruthenium II and carbonylchlorobezoato bis(tricyclohexylphosphine) ruthenium II.

Recently, Souza and co-workers reported (Journal of Applied Polymer Science, 2007, Vol. 106, pg 659-663) the hydrogenation of a nitrile rubber using a ruthenium catalyst of the general form $RuCl_2(PPh_3)_3$. While efficient hydrogenation was reported restrictions were placed on the solvent choice due to the necessity to minimize the nitrile group reduction.

The problem of reducing the molecular weight of a nitrile rubber is solved in the more recent prior art prior to hydrogenation by metathesis. Metathesis catalysts are known in the prior art.

In WO-A1-2008/034552a metathesis catalyst of formula (1) is disclosed

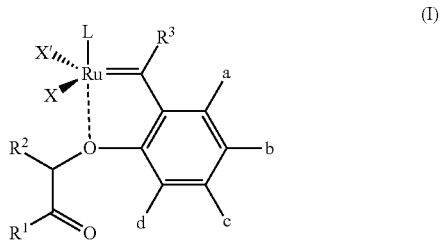

wherein
X and X' are anionic ligands, preferably halogen, more preferably Cl or Br;
L is a neutral ligand;
a, b, c, d are independently H, $-NO_2$, $C_{1-12}$ alkyl, $C_{1-12}$ alkoxy or phenyl, wherein phenyl may be substituted with a residue selected from the group $C_{1-6}$ alkyl and $C_{1-6}$ alkoxy;
$R^1$ is $C_{1-12}$ alkyl, $C_{5-6}$ cycloalkyl, $C_{7-18}$ aralkyl, aryl;
$R^2$ is H, $C_{1-12}$ alkyl, $C_{5-6}$ cycloalkyl, $C_{7-18}$ aralkyl, aryl;
$R^3$ is H, $C_{1-12}$ alkyl, $C_{5-6}$ cycloalkyl, $C_{7-18}$ aralkyl, aryl.

The catalyst of formula (I) is used in metathesis reactions in a process wherein two compounds are reacted each having one olefinic double bond or one of the compounds comprises at least two olefinic double bonds, in ring-closing metathesis (RCM) or cross-metathesis (CM).

In US 2002/0107138 A1 transition metal based metathesis catalysts and their organometallic complexes including dendrimeric complexes are disclosed, for example a Ru complex bearing a 1,3-dimesityl-4,5-dihydroimidazole-2-ylidene and styryl ether ligand. The catalyst can be used to catalyze ring-closing metathesis (RCM), cross metathesis (CM), ring-opening polymerization metathesis (ROMP) and acyclic diene metathesis (ADMET).

WO-A1-2004/035596 discloses ruthenium complexes as (pre)catalysts for metathesis reactions of the following formula 1

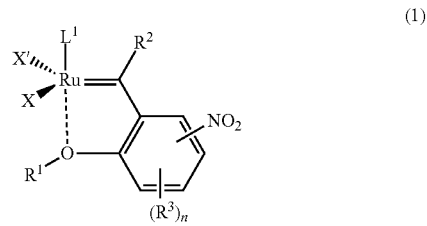

wherein
$L^1$ is a neutral ligand;
X and X' are anionic ligands;
$R^1$ is $-C_{1-5}$-alkyl or $-C_{5-6}$-cycloalkyl;

$R^2$ is H, —$C_{1-20}$-alkyl, —$C_{2-20}$-alkenyl, —$C_{2-20}$-alkinyl or aryl;

$R^3$ is —$C_{1-6}$-alkyl, —$C_{1-6}$-alkoxy or aryl, wherein aryl may be substituted with —$C_{1-6}$-alkyl or —$C_{1-6}$-alkoxy;

n is 0, 1, 2 or 3.

The compound of formula 1 may be used to catalyse olefin metathesis reactions including ring opening metathesis polymerisation (ROMP), ring closing metathesis (RCM), depolymerisation of unsaturated polymers, synthesis of telechelic polymers, ene-ine metathesis and olefin synthesis. In the examples in WO-A1-2004/035596 ring closing metathesis and cross metathesis reactions are shown.

However, the catalysts mentioned above are not necessarily suitable for carrying out the degradation of nitrile rubber. Further, the catalysts mentioned above are not necessarily suitable for hydrogenation reactions.

In WO 2005/080456 Guerin reports the preparation of hydrogenated nitrile rubber polymers having low molecular weights and narrower molecular weight distributions than those known in the art. The preparation process is carried out by simultaneously subjecting the nitrile rubber to a metathesis reaction and a hydrogenation reaction. The reaction according to WO 2005/080456 takes place in the presence of a ruthenium based catalyst of the general formula 1,3 bis(2,4,6-trimethylphenyl)-2-imidazolidinylidene)(tricyclohexylphosphine)ruthenium(phenylmethylene)dichloride (Grubbs $2^{nd}$ generation catalyst)

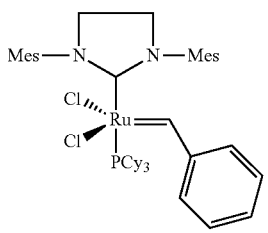

However, there is a need for alternative catalysts which are suitable for the preparation of hydrogenated nitrile rubber polymers in a simultaneous hydrogenation and metathesis reaction.

We have now discovered catalyst systems which facilitate the production of hydrogenated nitrile rubber having low molecular weights and narrower molecular weight distributions. Thus, the inventive process is capable of producing a hydrogenated nitrile rubber with low residual double bond contents (RDB) having a molecular weight ($M_w$) in the range of from 20,000 to 250,000, a Mooney viscosity (ML 1+4 @ 100 deg. C.) of in the range of from 1 to 50, and a MWD (or polydispersity index) of less than 3.0 in a single step.

The present invention therefore relates to a process for the production of a hydrogenated nitrile rubber comprising reacting a nitrile rubber in the presence of hydrogen, optionally at least one co-olefin, and in the presence of at least one compound of the general formula (I),

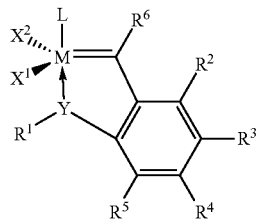

(I)

where

M is ruthenium or osmium,

Y is oxygen (O), sulphur (S), an N—$R^1$ radical or a P—$R^1$ radical, where $R^1$ is as defined below, $X^1$ and $X^2$ are identical or different ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl, $CR^{13}C(O)R^{14}$ or alkylsulphinyl radical, each of which may optionally be substituted by one or more alkyl, halogen, alkoxy, aryl or heteroaryl radicals, $R^{13}$ is hydrogen or alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals;

$R^{14}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals;

$R^2$, $R^3$, $R^4$ and $R^5$ are identical or different and are each hydrogen, organic or inorganic radicals, $R^6$ is hydrogen or an alkyl, alkenyl, alkynyl or aryl radical and L is a ligand.

As nitrite rubbers ("NBR"), it is possible to use copolymers or terpolymers which comprise repeating units of at least one conjugated diene, at least one α,β-unsaturated nitrite and, if desired, one or more further copolymerizable monomers.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Very particular preference is given to 1,3-butadiene and isoprene or mixtures thereof. Especial preference is given to 1,3-butadiene.

As α,β-unsaturated nitrite, it is possible to use any known α,β-unsaturated nitrite, preferably a ($C_3$-$C_5$) α,β-unsaturated nitrite such as acrylonitrile, methacrylonitrile, ethacrylonitrile or mixtures thereof. Particular preference is given to acrylonitrile.

A particularly preferred nitrite rubber is thus a copolymer of acrylonitrile and 1,3-butadiene.

Apart from the conjugated diene and the α,β-unsaturated nitrite, it is possible to use one or more further copolymerizable monomers known to those skilled in the art, e.g. α,β-unsaturated monocarboxylic or dicarboxylic acids, their esters or amides. As α,β-unsaturated monocarboxylic or dicarboxylic acids, preference is given to fumaric acid, maleic acid, acrylic acid and methacrylic acid. As esters of α,β-unsaturated carboxylic acids, preference is given to using their alkyl esters and alkoxyalkyl esters. Particularly preferred alkyl esters of α,β-unsaturated carboxylic acids are methyl acrylate, ethyl acrylate, butyl acrylate, butyl methacrylate, 2-ethylhexyl acrylate, 2-ethylhexyl methacrylate and octyl acrylate. Particularly preferred alkoxyalkyl esters of α,β-unsaturated carboxylic acids are methoxyethyl (meth)acrylate, ethoxyethyl (meth)acrylate and ethoxymethyl (meth)acrylate. It is also possible to use mixtures of alkyl esters, e.g. those mentioned above, with alkoxyalkyl esters, e.g. in the form of those mentioned above.

The proportions of conjugated diene and α,β-unsaturated nitrite in the NBR polymers to be used can vary within wide ranges. The proportion of or of the sum of the conjugated dienes is usually in the range from 40 to 90% by weight, preferably in the range from 55 to 75% by weight, based on the total polymer. The proportion of or of the sum of the α,β-unsaturated nitrites is usually from 10 to 60% by weight, preferably from 25 to 45% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or of the α,β-unsaturated nitrite or nitriles are replaced by the proportions of the additional monomers, with the proportions of all monomers in each case adding up to 100% by weight.

The preparation of nitrile rubbers by polymerization of the abovementioned monomers is adequately known to those skilled in the art and is comprehensively described in the polymer literature.

Nitrile rubbers which can be used for the purposes of the invention are also commercially available, e.g. as products from the product range of the trade names Perbunan® and Krynac® from Lanxess Deutschland GmbH.

The nitrile rubbers used for the hydrogenation/metathesis usually have a Mooney viscosity (ML 1+4 at 100° C.) in the range from 24 to 70, preferably from 28 to 40. This corresponds to a weight average molecular weight $M_w$ in the range 200 000-500 000, preferably in the range 200 000-400 000. The nitrile rubbers used also usually have a polydispersity $PDI=M_w/M_n$, where $M_w$ is the weight average molecular weight and $M_n$ is the number average molecular weight, in the range 2.0-6.0 and preferably in the range 2.0-4.0.

The determination of the Mooney viscosity is carried out in accordance with ASTM standard D1646.

According to the invention the substrate is simultaneously subject to a metathesis reaction and a hydrogenation reaction.

The compounds of the general formula (I) are known in principle. Representatives of this class of compounds are the catalysts described by Hoveyda et al. in US 2002/0107138 A1 and Angew Chem. Int. Ed. 2003, 42, 4592, and the catalysts described by Grela in WO-A-2004/035596, Eur. J. Org. Chem 2003, 963-966 and Angew. Chem. Int. Ed. 2002, 41, 4038 and in J. Org. Chem. 2004, 69, 6894-96 and Chem. Eur. J 2004, 10, 777-784 and the catalysts described by Arlt et al. in WO-A1-2008/034552. The catalysts are commercially available or can be prepared as described in the references cited.

The term "substituted" used for the purposes of the present patent application means that a hydrogen atom on an indicated radical or atom has been replaced by one of the groups indicated in each case, with the proviso that the valency of the atom indicated is not exceeded and the substitution leads to a stable compound.

For the purposes of the present patent application and invention, all the definitions of radicals, parameters or explanations given above or below in general terms or in preferred ranges can be combined with one another in any way, i.e. including combinations of the respective ranges and preferred ranges.

In the catalysts of the general formula (I), L is a ligand, usually a ligand having an electron donor function. Preferably, L is a phosphine, a sulphonated phosphine, a phosphate, a phosphinite, a phosphonite, an arsine, a stilbine, an ether, an amine, an amide, a sulphoxide, a carboxyl, a nitrosyl, a pyridine, a thioether, or L is a substituted or unsubstituted imidazolidine ("Im") ligand.

More preferably, the ligand L is a $C_6-C_{24}$-arylphosphine, $C_1-C_6$-alkylphosphine or $C_3-C_{10}$-cycloalkylphosphine ligand, a sulphonated $C_6-C_{24}$-arylphosphine or a sulphonated $C_1-C_{10}$-alkylphosphine ligand, a $C_6-C_{24}$-aryl phosphinite or $C_1-C_{10}$-alkyl phosphinite ligand, a $C_6-C_{24}$-aryl phosphonite or $C_1-C_{10}$-alkyl phosphonite ligand, a $C_6-C_{24}$-aryl phosphite or $C_1-C_{10}$-alkylphosphite ligand, a $C_6-C_{24}$-arylarsine or $C_1-C_{10}$-alkylarsine ligand, a $C_6-C_{24}$-arylamine or $C_1-C_{10}$-alkylamine ligand, a pyridine ligand, a $C_6-C_{24}$-aryl sulphoxide or $C_1-C_{10}$-alkyl sulphoxide ligand, a $C_6-C_{24}$-aryl ether or $C_1-C_{10}$-alkyl ether ligand or a $C_6-C_{24}$-arylamide or $C_1-C_{10}$-alkylamide ligand, each of which may be substituted by a phenyl group which may in turn be substituted by a halogen, $C_1-C_5$ alkyl radical or $C_1-C_5$-alkoxy radical, or L is a substituted or unsubstituted imidazolidine ("Im") ligand.

Even more preferably, L is a $P(R^7)_3$ radical, where the radicals $R^7$ are each, independently of one another, $C_1-C_6$-alkyl, $C_3-C_8$-cycloalkyl or aryl, or L is a substituted or unsubstituted imidazolidine ligand ("Im").

Suitable $P(R^7)_3$ radicals are selected from the group consisting of $PPh_3$, $P(p\text{-}Tol)_3$, $P(o\text{-}Tol)_3$, $PPh(CH_3)_2$, $P(CF_3)_3$, $P(p\text{-}FC_6H_4)_3$, $P(p\text{-}CF_3C_6H_4)_3$, $P(C_6H_4\text{—}SO_3Na)_3$, $P(CH_2C_6H_4\text{—}SO_3Na)_3$, $P(iso\text{-}Pr)_3$, $P(CHCH_3(CH_2CH_3))_3$, $P(cyclopentyl)_3$, $P(cyclohexyl)_3$, $P(neopentyl)_3$ and $P(neophenyl)_3$.

Alkyl is preferably $C_1-C_{12}$-Alkyl and is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl or n-hexyl, n-heptyl, n-octyl, n-decyl or n-dodecyl.

Cycloalkyl is preferably $C_3-C_8$-Cycloalkyl and encompasses, for example, cyclopropyl, cyclobutyl, cyclopentyl, cyclohexyl, cycloheptyl and cyclooctyl.

Aryl encompasses an aromatic radical having from 6 to 24 skeletal carbon atoms ($C_6-C_{24}$-aryl). Preferred monocyclic, bicyclic or tricyclic carbocyclic aromatic radicals having from 6 to 10 skeletal carbon atoms are, for example, phenyl, biphenyl, naphthyl, phenanthrenyl and anthracenyl.

The imidazolidine radical (Im) usually has a structure of the general formula (IIa) or (IIb),

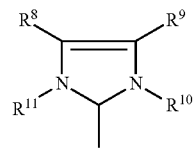

(IIa)

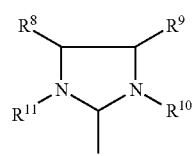

(IIb)

where

R⁸, R⁹, R¹⁰, R¹¹ are identical or different and are each hydrogen, straight-chain or branched $C_1$-$C_{30}$-alkyl, preferably $C_1$-$C_{20}$-alkyl, $C_3$-$C_{20}$-cycloalkyl, preferably $C_3$-$C_{10}$-cycloalkyl, $C_2$-$C_{20}$-alkenyl, preferably $C_2$-$C_{10}$-alkenyl, $C_2$-$C_{20}$-alkynyl, preferably $C_2$-$C_{10}$-alkynyl, $C_6$-$C_{24}$-aryl, preferably $C_6$-$C_{14}$-aryl, $C_1$-$C_{20}$-carboxylate, preferably $C_1$-$C_{10}$-carboxylate, $C_1$-$C_{20}$-alkoxy, preferably $C_1$-$C_{10}$-alkoxy, $C_2$-$C_{20}$-alkenyloxy, preferably $C_2$-$C_{10}$-alkenyloxy, $C_2$-$C_{20}$-alkynyloxy, preferably $C_2$-$C_{10}$-alkynyloxy, $C_6$-$C_{24}$-aryloxy, preferably $C_6$-$C_{14}$-aryloxy, $C_2$-$C_{20}$-alkoxycarbonyl, preferably $C_2$-$C_{10}$-alkoxycarbonyl, $C_1$-$C_{20}$-alkylthio, preferably $C_1$-$C_{10}$-alkylthio, $C_6$-$C_{24}$-arylthio, preferably $C_6$-$C_{14}$-arylthio, $C_1$-$C_{20}$-alkylsulphonyl, preferably $C_1$-$C_{10}$-alkylsulphonyl, $C_1$-$C_{20}$-alkylsulphonate, preferably $C_1$-$C_{10}$-alkylsulphonate, $C_6$-$C_{24}$-arylsulphonate, preferably $C_6$-$C_{14}$-arylsulphonate, or $C_1$-$C_{20}$-alkylsulphinyl, preferably $C_1$-$C_{10}$-alkylsulphinyl.

One or more of the radicals R⁸, R⁹, R¹⁰, R¹¹ may, independently of one another, optionally be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these abovementioned substituents may in turn be substituted by one or more radicals, preferably selected from the group consisting of halogen, in particular chlorine or bromine, $C_1$-$C_5$-alkyl, $C_1$-$C_5$-alkoxy and phenyl.

In a preferred embodiment of the catalysts of the general formula (I), R⁸ and R⁹ are each, independently of one another, hydrogen, $C_6$-$C_{24}$-aryl, particularly preferably phenyl, straight-chain or branched $C_1$-$C_{10}$-alkyl, particularly preferably propyl or butyl, or together form, with inclusion of the carbon atoms to which they are bound, a cycloalkyl or aryl radical, where all the abovementioned radicals may in turn be substituted by one or more further radicals selected from the group consisting of straight-chain or branched $C_1$-$C_{10}$-alkyl, $C_1$-$C_{10}$-alkoxy $C_6$-$C_{24}$-aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

In a preferred embodiment of the catalysts of the general formula (I), the radicals R¹⁰ and R¹¹ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, $C_6$-$C_{10}$-arylsulphonate, particularly preferably p-toluenesulphonate.

These radicals R¹⁰ and R¹¹ which are mentioned above as being preferred may optionally be substituted by one or more further radicals selected from the group consisting of straight-chain or branched $C_1$-$C_5$-alkyl, in particular methyl, $C_1$-$C_5$-alkoxy, aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

In particular, the radicals R¹⁰ and R¹¹ are identical or different and are each i-propyl, neopentyl, adamantyl or mesityl.

Particularly preferred imidazolidine radicals (Im) have the structures (IIIa-f), where Mes is in each case a 2,4,6-trimethylphenyl radical.

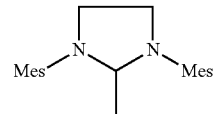
(IIIa)

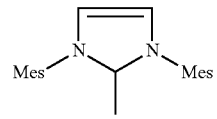
(IIIb)

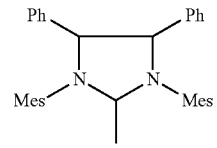
(IIIc)

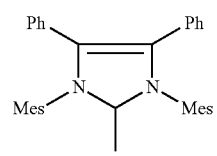
(IIId)

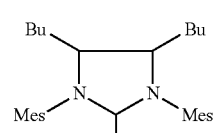
(IIIe)

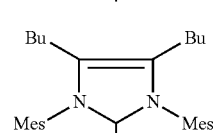
(IIIf)

In the catalysts of the general formula (I), X¹ and X² are identical or different ligands and can be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or C alkylsulphinyl.

The abovementioned radicals X¹ and X² can also be substituted by one or more further radicals, for example by halogen, preferably fluorine, $C_1$-$C_{10}$-alkyl, $C_1$-$C_{10}$-alkoxy or $C_6$-$C_{24}$-aryl radicals, where the latter radicals may optionally also in turn be substituted by one or more substituents selected from the group consisting of halogen, preferably fluorine, $C_1$-$C_5$-alkyl, $C_1$-$C_5$-alkoxy and phenyl.

In a preferred embodiment, X¹ and X² are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, X¹ and X² are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the general formula (I), the radical R¹ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals.

The radical $R^1$ is usually a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl radical, each of which may optionally be substituted by one or more alkyl, halogen, alkoxy, aryl or heteroaryl radicals.

$R^1$ is preferably a $C_3$-$C_{20}$-cycloalkyl radical, a $C_6$-$C_{24}$-aryl radical or a straight-chain or branched $C_1$-$C_{30}$-alkyl radical, with the latter optionally being able to be interrupted by one or more double or triple bonds or one or more heteroatoms, preferably oxygen or nitrogen. $R^1$ is particularly preferably a straight-chain or branched $C_1$-$C_{12}$-alkyl radical, most preferably, $R^1$ is methyl or isopropyl.

In the general formula (I), the radicals $R^2$, $R^3$, $R^4$ and $R^5$ are identical or different and are each hydrogen, organic or inorganic radicals.

In a preferred embodiment, $R^2$, $R^3$, $R^4$, $R^5$ are identical or different and are each hydrogen, halogen, nitro, $CF_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, each of which may optionally be substituted by one or more alkyl, alkoxy, halogen, aryl or heteroaryl radicals.

$R^2$, $R^3$, $R^4$, $R^5$ are more preferably identical or different and are each hydrogen, halogen, preferably chlorine or bromine, nitro, $CF_3$, $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl, each of which may optionally be substituted by one or more $C_1$-$C_{30}$-alkyl, $C_1$-$C_{20}$-alkoxy, halogen, $C_6$-$C_{24}$-aryl or heteroaryl radicals.

In a particularly useful embodiment, $R^2$, $R^3$, $R^4$, $R^5$ are identical or different and are each nitro, a straight-chain or branched $C_1$-$C_{30}$-alkyl or $C_6$-$C_{20}$-cycloalkyl radical, a straight-chain or branched $C_1$-$C_{20}$-alkoxy radical or a $C_6$-$C_{24}$-aryl radical, preferably phenyl or naphthyl. The $C_1$-$C_{30}$-alkyl radicals and $C_1$-$C_{20}$-alkoxy radicals may optionally be interrupted by one or more double or triple bonds or one or more heteroatoms, preferably oxygen or nitrogen.

Furthermore, two or more of the radicals $R^2$, $R^3$, $R^4$ or $R^5$ can be bridged via aliphatic or aromatic structures. For example, $R^3$ and $R^4$ can, with inclusion of the carbon atoms to which they are bound in the phenyl ring of the formula (I), form a fused-on phenyl ring so that overall a naphthyl structure results.

In the general formula (I), $R^6$ is hydrogen or an alkyl, alkenyl, alkynyl or aryl radical. $R^6$ is preferably hydrogen or a $C_1$-$C_{30}$-alkyl radical, a $C_2$-$C_{20}$-alkenyl radical, a $C_2$-$C_{20}$-alkynyl radical or a $C_6$-$C_{24}$-aryl radical. $R^6$ is particularly preferably hydrogen.

Particularly suitable compounds of the general formula (I) are compounds of the following general formula (IV)

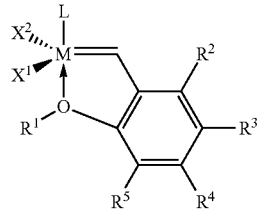

(IV)

where
M, L, $X^1$, $X^2$, $R^1$, $R^2$, $R^3$, $R^4$ and $R^5$ have the meanings given for the general formula (I) as well as the preferred meanings mentioned before.

These catalysts are known in principle, for example from US 2002/0107138 A1 (Hoveyda et al.), and can be obtained by preparative methods indicated there.

Particular preference is given to catalysts of the general formula (IV) in which
M is ruthenium,
$X^1$ and $X^2$ are both halogen, in particular, both chlorine,
$R^1$ is a straight-chain or branched $C_1$-$C_{12}$-alkyl radical,
$R^2$, $R^3$, $R^4$, $R^5$ have the meanings and preferred meanings given for the general formula (I) and
L has the meanings and preferred meanings given for the general formula (I).

Very particular preference is given to catalysts of the general formula (IV) in which
M is ruthenium,
$X^1$ and $X^2$ are both chlorine,
$R^1$ is an isopropyl radical,
$R^2$, $R^3$, $R^4$, $R^5$ are all hydrogen and
L is a substituted or unsubstituted imidazolidine radical of the formula (IIa) or (IIb),

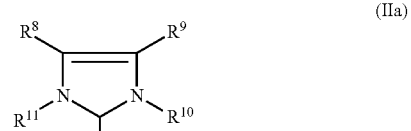

(IIa)

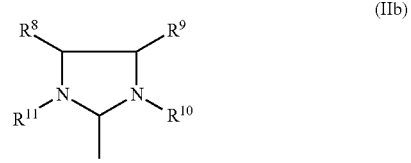

(IIb)

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl.

A very particularly preferred catalyst which comes under the general structural formula (IV) is that of the formula (V)

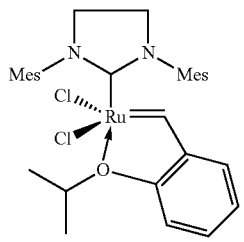
(V)

which is also referred to as "Hoveyda catalyst" in the literature.

Further suitable compounds which come under the general structural formula (IV) are those of the formulae (VI), (VII), (VIII), (IX), (X), (XI), (XII) and (XIII), where Mes is in each case a 2,4,6-trimethylphenyl radical

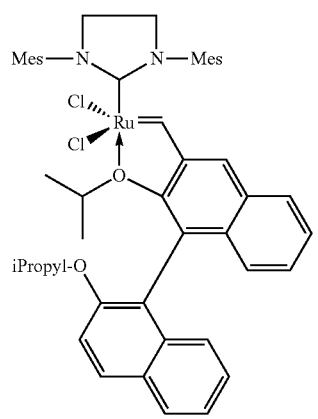
(VI)

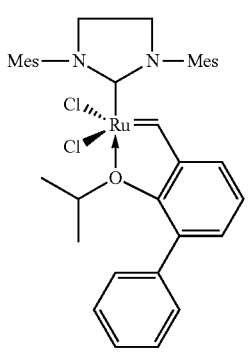
(VII)

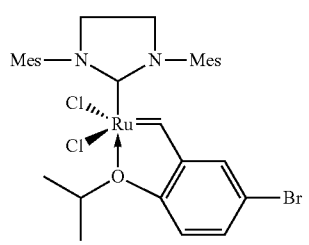
(VIII)

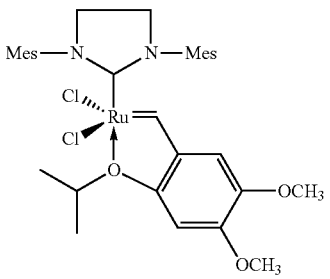
(IX)

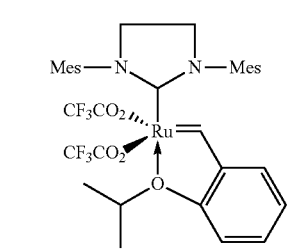
(X)

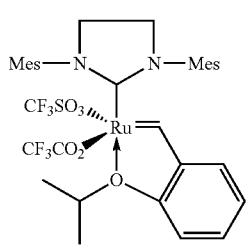
(XI)

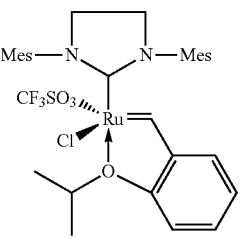
(XII)

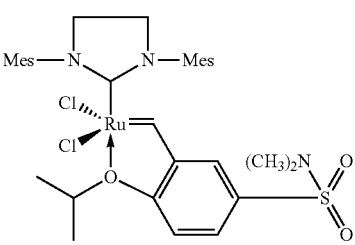
(XIII)

Further compounds of the general formula (I) which are particularly suitable for the process according to the invention are compounds of the general formula (XIV)

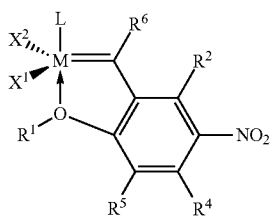

(XIV)

where

M, L, $X^1$, $X^2$, $R^1$, $R^2$, $R^4$ and $R^5$ and $R^6$ have the meanings and preferred meanings given for the general formula (I), These compounds are known in principle, for example from WO-A-2004/035596 (Grela), and can be obtained by the preparative methods indicated there.

Particular preference is given to catalysts of the general formula (XIV) in which M is ruthenium, $X^1$ and $X^2$ are both halogen, in particular both chlorine, $R^1$ is a straight-chain or branched $C_1$-$C_{12}$-alkyl radical, $R^2$, $R^4$ and $R^5$ has are identical or different and have the meanings and preferred meanings given for the general formula (I), L has the meanings and preferred meanings given for the general formula (I).

Very particular preference is given to compounds of the general formula (XIV) in which M is ruthenium, $X^1$ and $X^2$ are both chlorine, $R^1$ is an isopropyl radical, $R^2$, $R^4$ and $R^5$ are each hydrogen, and L is a substituted or unsubstituted imidazolidine radical of the formula (IIa) or (IIb),

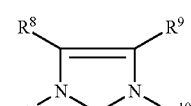

(IIa)

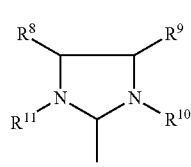

(IIb)

where $R^8$, $R^9$, $R^{10}$, $R^{11}$ are identical or different and are each hydrogen, straight-chain or branched, cyclic or acyclic $C_1$-$C_{30}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl.

A particularly suitable compound which comes under the general formula (XIV) has the structure (XV)

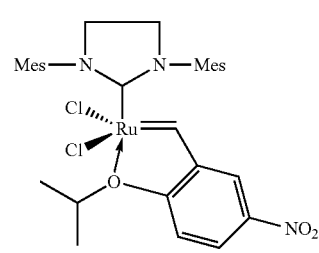

(XV)

and is also referred to in the literature as "Grela catalyst".

A further suitable compound which comes under the general formula (XIV) has the structure (XVI).

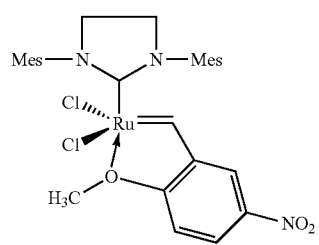

(XVI)

Further compounds of the general formula (I) which are particularly suitable for the process according to the invention are compounds of the general formula (XVII)

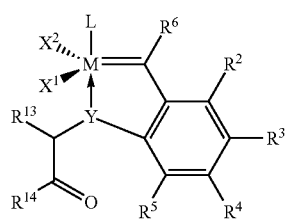

(XVII)

where

M is ruthenium or osmium,

Y is oxygen (O) or an N—$R^1$ radical, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals, $X^1$ and $X^2$ are identical or different ligands, $R^6$ is hydrogen or an alkyl, alkenyl, alkynyl or aryl radical, $R^2$, $R^3$, $R^4$ and $R^5$ are identical or different and are each hydrogen, organic or inorganic radicals, $R^{14}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals, $R^{13}$ is hydrogen or alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals, and L is a ligand.

The compounds of the general formula (XVII) are known in principle. Representatives of this class of compounds are the catalysts described by Arlt et al. in WO 2008/034552 A1.

In the general formula (XVII), the radicals $R^{13}$ and $R^{14}$ are an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals.

The radicals $R^{13}$ and $R^{14}$ are preferably a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl radical, each of which may optionally be substituted by one or more alkyl, alkoxy, aryl or heteroaryl radicals.

The radical $R^{13}$ can also optionally be hydrogen.

$R^{13}$ and $R^{14}$ are preferably independently of each other a $C_3$-$C_{20}$-cycloalkyl radical, a $C_6$-$C_{24}$-aryl radical or a straight-chain or branched $C_1$-$C_{30}$-alkyl radical, with the latter optionally being able to be interrupted by one or more double or triple bonds or one or more heteroatoms, preferably oxygen or nitrogen.

Particular preference is given to compounds of the general formula (XVII) in which M is ruthenium, $X^1$ and $X^2$ are both halogen, in particular, both chlorine, $R^1$ is hydrogen, $R^2$, $R^3$, $R^4$, $R^5$ have the meanings given for the general formula (I), $R^{13}$, $R^{14}$ has the meanings given for the general formula (I) and L has the meanings given for the general formula (I).

Very particular preference is given to compounds of the general formula (XVII) in which M is ruthenium, $X^1$ and $X^2$ are both chlorine, $R^1$ is hydrogen, $R^2$, $R^3$, $R^4$, $R^5$ are all hydrogen, $R^{13}$ is methyl $R^{14}$ is methyl and L is a substituted or unsubstituted imidazolidine radical of the formula (IIa) or (IIb),

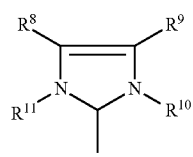

(IIa)

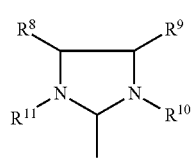

(IIb)

where $R^8$, $R^9$, $R^{10}$, $R^{11}$ are identical or different and are each hydrogen, straight-chain or branched, cyclic or acyclic $C_1$-$C_{30}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl.

A particularly suitable compound which comes under the general formula (XVII) has the structure (XVIII), herein referred as the 'Arlt Catalyst'

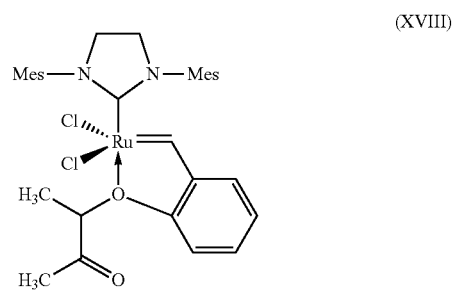

(XVIII)

In an alternative embodiment, the compounds of the general formula (I) are dendritic compounds of the general formula (XIV),

(XIV)

where $D^1$, $D^2$, $D^3$ and $D^4$ each have a structure of the general formula (XV) which is bound via the methylene group to the silicon of the formula (XIV),

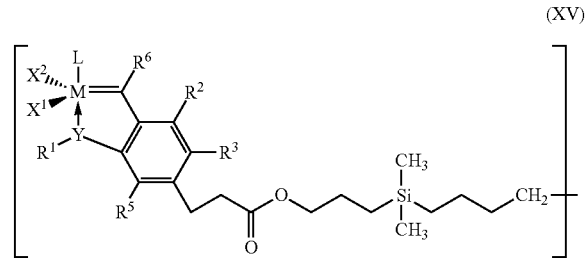

(XV)

where

M, L, $X^1$, $X^2$, $R^1$, $R^2$, $R^3$, $R^5$ and $R^6$ have the meanings given for the general formula (I) or can have the meanings given for all the above-mentioned preferred or particularly preferred embodiments.

Such compounds of the general formula (XV) are known from US 2002/0107138 A1 and can be prepared according to the information given there.

Most preferred compounds of the general formula (I) for carrying out the process of the present invention are the compounds of the general formula (IV). Preferred compounds of the general formula (IV) are the compounds of formulae (V), (VI), (VII), (VIII), (IX), (X), (XI), (XII) and (XIII). Most preferred is the compound of formula (V).

All the abovementioned compounds of the formulae (I) and (IV)-(XV) can either be used as such for the simultaneous metathesis and hydrogenation of NBR or can be applied to and immobilized on a solid support. As solid phases or supports, it is possible to use materials which firstly are inert towards the reaction mixture of the metathesis and secondly do not impair the activity of the catalyst. It is possible to use, for example, metals, glass, polymers, ceramic, organic polymer spheres or inorganic sol-gels for immobilizing the catalyst.

The compounds of all the abovementioned general and specific formulae (I) and (IV)-(XV) are highly suitable for the simultaneous metathesis and hydrogenation of nitrile rubber.

The amount of the compound of the formula (I) employed in the process according to the invention for the metathesis and hydrogenation depends on the nature and the catalytic activity of the specific catalyst. The amount of catalyst used is usually from 1 to 1000 ppm of noble metal, preferably from 5 to 500 ppm, in particular from 5 to 250 ppm, more preferably 5 to 100 ppm, based on the nitrile rubber used.

The NBR simultaneous metathesis and hydrogenation can optionally be carried out with a coolefin. Suitable coolefins are, for example, ethylene, propylene, isobutene, styrene, 1-hexene and 1-octene.

The simultaneous metathesis and hydrogenation reaction can be carried out in a suitable solvent which does not deactivate the catalyst used and also does not adversely affect the reaction in any other way. Preferred solvents include but are not restricted to dichloromethane, benzene, toluene, methyl ethyl ketone, acetone, tetrahydrofuran, tetrahydropyran, dioxane and cyclohexane. The particularly preferred solvent is chlorobenzene.

The concentration of NBR in the reaction mixture is not critical but, obviously, should be such that the reaction is not hampered if the mixture is too viscous to be stirred efficiently, for example. Preferably, the concentration of NBR is in the range of from 1 to 40% by weight, most preferably in the range of from 6 to 15 wt. %.

The concentration of hydrogen is usually between 100 psi and 2000 psi, preferably 800 psi and 1400 psi.

The process is preferably carried out at a temperature in the range of from 60 to 200° C.; preferably in the range of from 100 to 140° C.

The reaction time will depend upon a number of factors, including cement concentration, amount of catalyst (compound of the general formula (I)) used and the temperature at which the reaction is performed. The progress of the reaction may be monitored by standard analytical techniques, for example using GPC or solution viscosity. Whenever referenced throughout the specification the molecular weight distribution of the polymer was determined by gel permeation chromatography (GPC) carried out according to DIN 55672-1 version 2007.

Hydrogenation in this invention is understood by preferably more than 50% of the residual double bonds (RDB) present in the starting nitrile polymer being hydrogenated, preferably more than 90% of the RDB are hydrogenated, more preferably more than 95% of the RDB are hydrogenated and most preferably more than 99% of the RDB are hydrogenated.

Due to the low viscosity of the resulting HNBR, it is ideally suited to be processed by but not limited to injection molding technology. The polymer can also be useful to transfer molding, to compression molding, or to liquid injection molding Further, the polymer obtained in the process of the present invention is very well suited for the manufacture of a shaped article, such as a seal, hose, bearing pad, stator, well head seal, valve plate, cable sheathing, wheel, roller, pipe seal, in place gaskets or footwear component prepared by injection molding technology.

In a further embodiment the present invention relates to the use of a compound of the general formula (I)

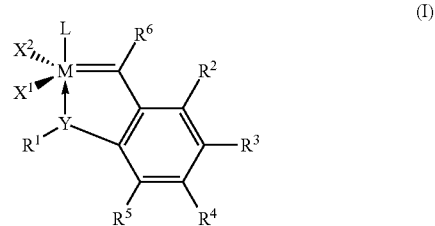

where

M is ruthenium or osmium,

Y is oxygen (O), sulphur (S), an N—$R^1$ radical or a P—$R^1$ radical, where $R^1$ is as defined below, $X^1$ and $X^2$ are identical or different ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl, $CR^{13}C(O)R^{14}$ or alkylsulphinyl radical, each of which may optionally be substituted by one or more alkyl, halogen, alkoxy, aryl or heteroaryl radicals, $R^{13}$ is hydrogen or alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals;

$R^{14}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals;

$R^2$, $R^3$, $R^4$ and $R^5$
are identical or different and are each hydrogen, organic or inorganic radicals, $R^6$ is hydrogen or an alkyl, alkenyl, alkynyl or aryl radical and L is a ligand, in a process for the production of a hydrogenated nitrile rubber by simultaneous hydrogenantion and metathesis of a nitrile rubber.

Preferred groups M, Y, $X^1$, $X^2$, $R^1$, $R^{13}$, $R^{14}$, $R^2$, $R^3$, $R^4$, $R^5$, $R^6$ and L as well as particularly preferred compounds of the general formula (I) are mentioned before.

EXAMPLES

Examples 1-2

The following catalysts were used:
"Hoveyda Catalyst" (According to the Invention):

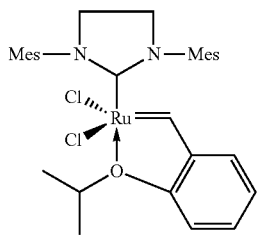

The Hoveyda catalyst was procured from Aldrich under the product number 569755.
"Arlt Catalyst" (According to the Invention):

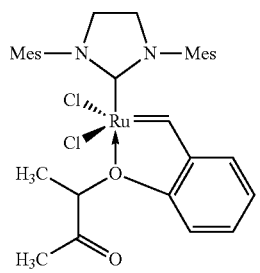

The Arlt catalyst was prepared by the method described by Arlt et al. in WO 2008/034552 A1.
Wilkinson's Catalyst (Comparison):

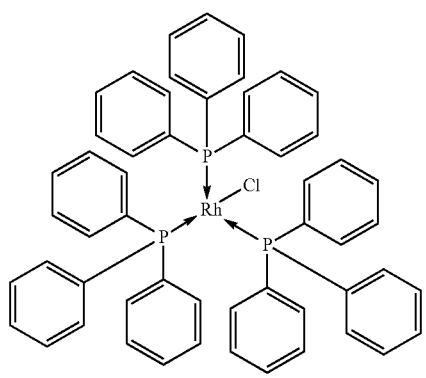

The Wilkinson's catalyst was procured from Umicore AG.

The degradation reactions described below were carried out using the nitrile rubber Perbunan® NT 3429 from Lanxess Deutschland GmbH. This nitrile rubber had the following characteristic properties:
Acrylonitrile content: 34% by weight
Mooney viscosity (ML 1+4 @100° C.): 28 Mooney units
Residual moisture content: <0.5% by weight
$M_w$: 214 000 g/mol
$M_n$: 67 000 g/mol
PDI ($M_w/M_n$): 3.2

In the text that follows, this nitrile rubber is referred to as NBR for short.

518 grams of nitrile rubber were dissolved in 4300 grams of monochlorobenzene at room temperature and agitated for 12 hours. The 12% solution was than transferred to a high pressure reactor agitating at 600 rpm, where the rubber solution was degassed 3 times with $H_2$ (100 psi) under full agitation. The temperature of the reactor was raised to 130° C. and a monochlorobenzene solution containing the catalyst and triphenylphosphine (if needed) was added to the reactor. The pressure was set to 85 bar and the temperature was allowed to increase to 138° C. and maintained constant for the duration of the reaction. The hydrogenation reaction was monitored by measuring the residual double bond (RDB) level at various intervals using IR spectroscopy.

On completion of the reaction GPC analysis was carried out according to DIN 55672-1 version 2007.

The Mooney viscosity (ML 1+4 @100° C.) was determined utilizing ASTM standard D 1646.

The following characteristic properties were determined by means of GPC analysis both for the original NBR rubber (before degradation) and for the degraded nitrile rubbers:
$M_w$ [kg/mol]: weight average molar mass
$M_n$ [kg/mol]: number average molar mass
PDI: width of the molar mass distribution ($M_w/M_n$)

Example 1

Details

TABLE 1

Comparison of Hydrogenation Parameters

|  | HNBR 1 | HNBR 2 | HNBR 3 |
|---|---|---|---|
| Hydrogenation Catalyst | Hoveyda | Arlt | Wilkinson's |
| Catalyst Amount (phr) | 0.041 | 0.045 | 0.060 |
| Metal content (ppm) | 65.6 | 65.6 | 65.6 |
| Co-Catalyst | NIL | NIL | Triphenylphosphine |
| Co-Catalyst Amount (phr) | NIL | NIL | 1.0 |

TABLE 2

Comparison of Hydrogenation Profiles

| Reaction Time (min) | HNBR 1 RDB % | HNBR 2 RDB % | HNBR 3 RDB % |
|---|---|---|---|
| 0 | 100 | 100 | 100 |
| 60 | 2.5 | 7.0 | 15.4 |
| 120 | 0.6 | 4.5 | 3.1 |
| 180 | 0.5 | 3.9 | 1.3 |
| 240 | 0.4 | 3.5 | 0.7 |

TABLE 3

Summary of HNBR Properties after 240 min

|  | Mw (g/mol) | Mn (g/mol) | PDI (Mw/Mn) | Mooney Viscosity |
|---|---|---|---|---|
| HNBR 1 | 113371 | 48352 | 2.34 | 33.3 |
| HNBR 2 | 133758 | 54595 | 2.45 | 41.3 |
| HNBR 3 | 195304 | 64130 | 3.05 | 69.3 |

As can be observed from Tables 2 and 3, the catalyst according to this invention (HNBR 1) perform more efficiently in terms of hydrogenation than that of the industrial norm (HNBR 3). Similarly we observe that the catalyst according to this invention (HNBR 1 & HNBR 2) in conjunction with hydrogenation reduced the molecular weight of the nitrile polymer, resulting in a low molecular weight hydrogenated nitrile rubber.

What is claimed is:

1. A process for the production of a hydrogenated nitrile rubber, the process comprising contacting a nitrile rubber with a compound of formula (I),

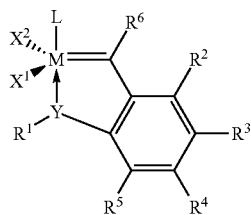

(I)

wherein:

M is ruthenium or osmium,

Y is oxygen (O), sulphur (S), an N—$R^1$ radical or a P—$R^1$ radical, where $R^1$ is as defined below, $X^1$ and $X^2$ are identical or different ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl, $CR^{13}C(O)R^{14}$ or alkylsulphinyl radical, each of which may optionally be substituted by one or more alkyl, halogen, alkoxy, aryl or heteroaryl radicals, $R^{13}$ is hydrogen or alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals;

$R^{14}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals;

$R^2$, $R^3$, $R^4$ and $R^5$ are identical or different and are each hydrogen, organic or inorganic radicals, $R^6$ is hydrogen or an alkyl, alkenyl, alkynyl or aryl radical and L is a ligand, and the compound of formula (I) simultaneously catalyzes metathesis and hydrogenation of the nitrile rubber.

2. The process according to claim 1, wherein the ligand L is a phosphine, a sulphonated phosphine, phosphate, phosphinite, phosphonite, arsine, stibine, ether, amine, amide, sulphoxide, carboxyl, nitrosyl, pyridine, thioether, or L is a substituted or unsubstituted imidazolidine ("Im") ligand.

3. The process according to claim 2, wherein the imidazolidine radical (Im) has a structure of formula (IIa) or (IIb),

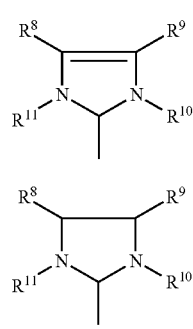

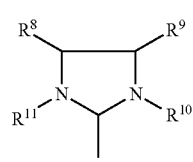

where $R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_1$-$C_{24}$-arylthio, $C_1$-$C_{20}$-alkylsulphonyl, $C_1$-$C_{20}$-alkylsulphonate, $C_6$-$C_{24}$-arylsulphonate, or $C_1$-$C_{20}$-alkylsulphinyl.

4. The process according to any one of claims 1 to 3, wherein $X^1$ and $X^2$ are identical or different and represent hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_1$-$C_{20}$-alkykldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl.

5. The process according to any one of claims 1 to 3, wherein the compound of formulae (I) is a compound of formula (IV)

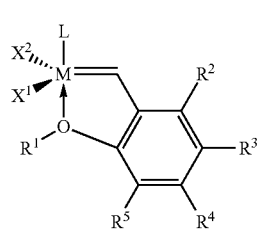

(IV)

wherein

M is ruthenium, $X^1$ and $X^2$ are both halogen, $R^1$ is a straight-chain or branched $C_1$-$C_{12}$-alkyl radical, $R^2$, $R^3$, $R^4$, $R^5$ are identical or different and are each hydrogen, organic or inorganic radicals, and L is a ligand.

6. The process according to claim 5, wherein in the compound of formula (IV)

M is ruthenium, $X^1$ and $X^1$ are both chlorine, $R^1$ is an isopropyl radical, $R^2$, $R^3$, $R^4$, $R^5$ are all hydrogen, and L is a substituted or unsubstituted imidazolidine radical of the formula (IIa) or (IIb),

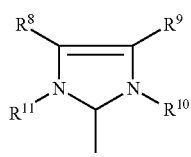

(IIa)

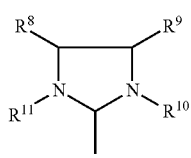

(IIb)

where $R^8, R^9, R^{10}, R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl.

7. The process according to claim 5, wherein the compound of the formula (IV) is selected from the compounds of formulae (V), (VI), (VII), (VIII), (IX), (X), (XI), (XII) and (XIII), where Mes is in each case a 2,4,6-trimethylphenyl radical

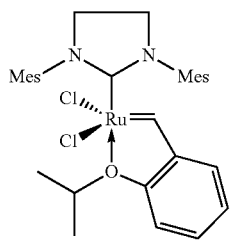

(V)

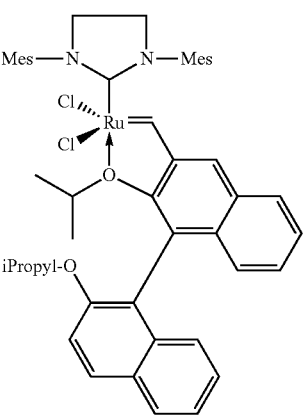

(VI)

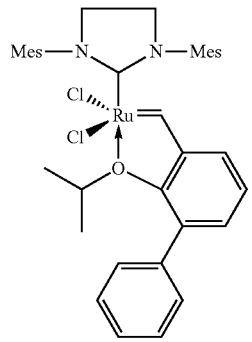

(VII)

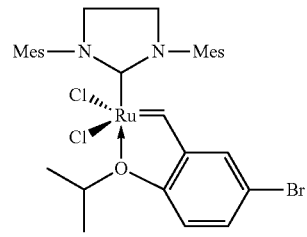

(VIII)

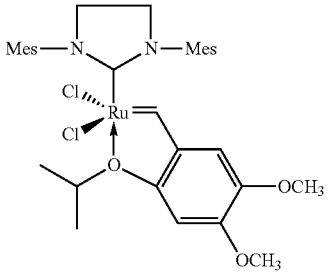

(IX)

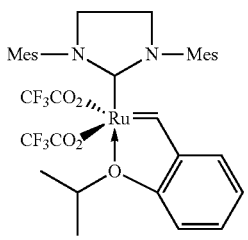

(X)

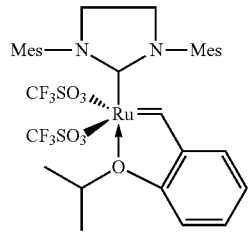

(XI)

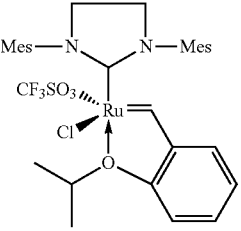

(XII)

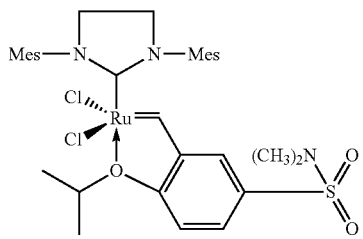

(XIII)

8. The process according to claim 1, wherein the compound of formula (I) is a compound of formula (XIV)

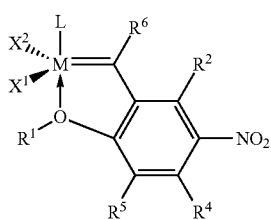

(XIV)

where

M is ruthenium or osmium, $X^1$ and $X^2$ are identical or different ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl, $CR^{13}C(O)R^{14}$ or alkylsulphinyl radical, each of which may optionally be substituted by one or more alkyl, halogen, alkoxy, aryl or heteroaryl radicals, $R^{13}$ is hydrogen or alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals;

$R^{14}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals;

$R^2$, $R^4$ and $R^5$ are identical or different and are each hydrogen, organic or inorganic radicals, $R^6$ is hydrogen or an alkyl, alkenyl, alkynyl or aryl radical, and L is a ligand.

9. The process according to claim 8, wherein in the compounds of formula (XIV)

M is ruthenium, $X^1$ and $X^2$ are both chlorine, $R^1$ is an isopropyl radical, $R^2$, $R^4$ and $R^5$ are each hydrogen, and L is a substituted or unsubstituted imidazolidine radical of the formula (IIa) or (IIb),

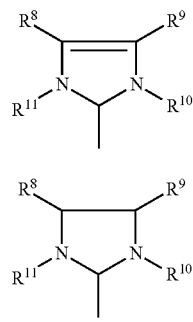

(IIa)

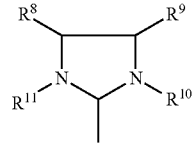

(IIb)

where $R^8$, $R^9$, $R^{10}$, $R^{11}$ are identical or different and are each hydrogen, straight-chain or branched, cyclic or acyclic $C_1$-$C_{30}$-alkyl, $C_2$-$C_{20}$-alkenyl, $C_2$-$C_{20}$-alkynyl, $C_6$-$C_{24}$CO-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl.

10. The process according to claim 1, wherein the compound of formula (I) has is a compound of formula (XVII)

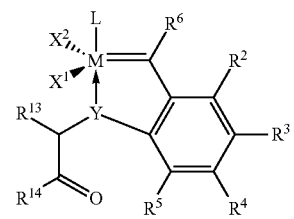

(XVII)

where

M is ruthenium or osmium,

Y is oxygen (O) or an N—$R^1$ radical, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl, or alkylsulphinyl radical, each of which may optionally be substituted by one or more alkyl, halogen, alkoxy, aryl or heteroaryl radicals, $X^1$ and $X^2$ are identical or different ligands, $R^6$ is hydrogen or an alkyl, alkenyl, alkynyl or aryl radical, $R^2$, $R^3$, $R^4$ and $R^5$ are Identical or different and are each hydrogen, organic or inorganic radicals, $R^{14}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals, $R^{13}$ is hydrogen or alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals; and L is a ligand.

11. The process according to claim 10, wherein in the general compound of formula (XVII)

M is ruthenium, $X^1$ and $X^2$ are both chlorine, $R^1$ is hydrogen, $R^2, R^3, R^4, R^5$ are all hydrogen, $R^{13}$ is methyl $R^{14}$ is methyl and L is a substituted or unsubstituted imidazolidine radical of the formula (IIa) or (IIb),

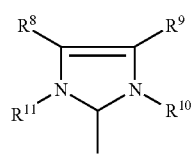

(IIa)

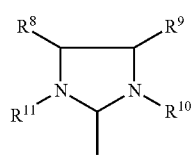

(IIb)

where $R^8, R^9, R^{10}, R^{11}$ are identical or different and are each hydrogen, straight-chain or branched, cyclic or acyclic $C_1$-$C_{30}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl.

12. The process according to claim 1, wherein the process comprises contacting the nitrile rubber with a compound of formula (XIV), wherein the compound of formula (I) is a portion of the $D^1$, $D^2$, $D^3$, and $D^4$ components of the compound of formula (XIV),

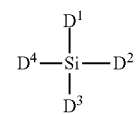

(XIV)

where $D^1, D^2, D^3$ and $D^4$ each have a structure of the general formula (XV) which is bound via the methylene group to the silicon of the formula (XIV),

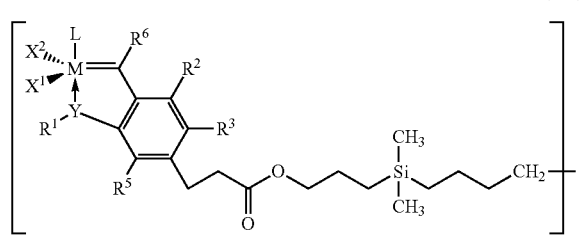

(XV)

where

M is ruthenium or osmium,

Y is oxygen (O), sulphur (S), an N—$R^1$ radical or a P—$R^1$ radical, where $R^1$ is as defined below, $X^1$ and $X^2$ are identical or different ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals, $R^2, R^3$ and $R^5$ are identical or different and are each hydrogen, organic or inorganic radicals, $R^6$ is hydrogen or an alkyl, alkenyl, alkynyl or aryl radical and L is a ligand.

13. The process according to claim 1, wherein the hydrogenation reaction is carried out in a suitable solvent selected from the group consisting of dichloromethane, benzene, toluene, methyl ethyl ketone, acetone, tetrahydrofuran, tetrahydropyran, dioxane and cyclohexane.

14. The process according to claim 1, wherein the amount of the compound of formula (I) is from 5 to 1000 ppm of noble metal based on the nitrile rubber used.

* * * * *